United States Patent [19]

Todman et al.

[11] Patent Number: 5,085,038
[45] Date of Patent: Feb. 4, 1992

[54] GAS TURBINE ENGINE

[75] Inventors: Michael T. Todman, Leamington SPA; Simon A. James; Michael L. Parker, both of Conventry, all of England

[73] Assignee: Rolls-Royce plc, London, England

[21] Appl. No.: 524,020

[22] Filed: May 16, 1990

[30] Foreign Application Priority Data

Jun. 28, 1989 [GB] United Kingdom ............ 8914825

[51] Int. Cl.$^5$ ............................................. F02C 7/10
[52] U.S. Cl. ................................ 60/39.37; 60/39.511
[58] Field of Search ............ 60/39.31, 39.32, 39.36, 60/39.37, 39.511, 751

[56] References Cited

U.S. PATENT DOCUMENTS

| | | |
|---|---|---|
| 2,778,192 | 1/1957 | Kroon . |
| 3,228,190 | 1/1966 | Brown .................. 60/39.511 |
| 3,740,948 | 6/1973 | Kellett .................... 60/261 |
| 4,129,985 | 12/1978 | Kajita et al. ............ 60/39.37 |
| 4,130,989 | 12/1978 | Wirth et al. . |
| 4,382,359 | 5/1983 | Sampayo . |
| 4,458,481 | 7/1984 | Ernst .................... 60/39.511 |
| 4,573,315 | 3/1986 | Stroem .................. 60/39.37 |
| 4,813,228 | 3/1989 | Hueller ................. 60/39.511 |

FOREIGN PATENT DOCUMENTS 1477648 6/1977 United Kingdom .
1533176 11/1978 United Kingdom .

Primary Examiner—Richard A. Bertsch
Assistant Examiner—Timothy S. Thorpe
Attorney, Agent, or Firm—Cushman, Darby & Cushman

[57] ABSTRACT

In a gas turbine engine power unit the gas turbine engine is provided with combustion chambers whose axes are perpendicular to the engine longitudinal axis. Each combustion chamber is located within and supported by a corresponding tubular member. Each tubular member is supported from a first annular manifold and in turn supports a second annular manifold which is located wholly within the first manifold. The first manifold receives air from the gas turbine engine compressor and directs it to a regenerative heat exchanger. Heated air returned from the regenerative heat exchanger is directed to the second manifold from where it flows through apertures in the tubular members to the combustion chambers. The manner in which the manifolds and combustion chambers are mounted reduces stresses arising from thermal gradients.

2 Claims, 3 Drawing Sheets

GAS TURBINE ENGINE

This invention relates to a gas turbine engine power unit including a power turbine and in particular to a gas turbine engine power unit having a regenerative heat exchanger located in the hot exhaust outlet of the power turbine of the unit.

It is sometimes necessary in the design of gas turbine engine power units, particularly those which are intended for industrial or marine use and have a regenerative heat exchanger, to provide the gas turbine engine with combustion chambers, having axes which are radially disposed with respect to the longitudinal axis of the engine. Such engines require the provision of manifolds which serve to collect air which has been exhausted from the engine's compressor prior to that air being directed to the heat exchanger and a manifold which serves to collect air returned from the heat exchanger prior to that air being directed to the engine's combustion chambers.

A convenient arrangement for the manifolds is to locate one manifold within the other so that the manifold containing the hot air returned from the heat exchanger is enclosed within the manifold containing cooler air exhausted from the engine's compressor. However such an arrangement gives rise to problems associated with high thermal gradients at certain component interfaces and the stresses which result from such thermal gradients. Moreover, difficulties can be encountered in ensuring that the combustion chambers, and the nozzles for fuel entry into, and combustion product discharge from the combustion chambers, all remain in alignment notwithstanding the presence of such thermal gradients.

It is an object of the present invention to provide a gas turbine engine power unit having combustion apparatus which substantially avoids the aforementioned problems.

According to the present invention, a gas turbine engine power unit includes a regenerative heat exchanger and a gas turbine engine having a plurality of combustion chambers, the axes of which combustion chambers are arranged to be incident to the longitudinal axis of said engine, a first annular manifold located externally of the casing of said engine coaxial with the longitudinal axis of said engine and adapted to receive air exhausted from the compressor of said engine, means adapted to direct air from said first manifold to said regenerative heat exchanger, means adapted to return said air from said regenerative heat exchanger having been heated therein to a second annular manifold located wholly within and coaxial with said first manifold, each of said combustion chambers being located within and solely supported from a corresponding generally tubular member, each of said generally tubular members being supported from said first manifold and at least partially located within said second manifold, adapted in turn to support said second manifold and additionally apertured to facilitate the flow of air from said second manifold to said combustion chambers to support combustion therein, said casing being apertured to receive each of said generally tubular members so as to facilitate the exhaustion of combustion products from said combustion chambers to the turbine of said engine.

The invention will now be described by way of example, with reference to the accompanying drawings in which.

Figure 1:
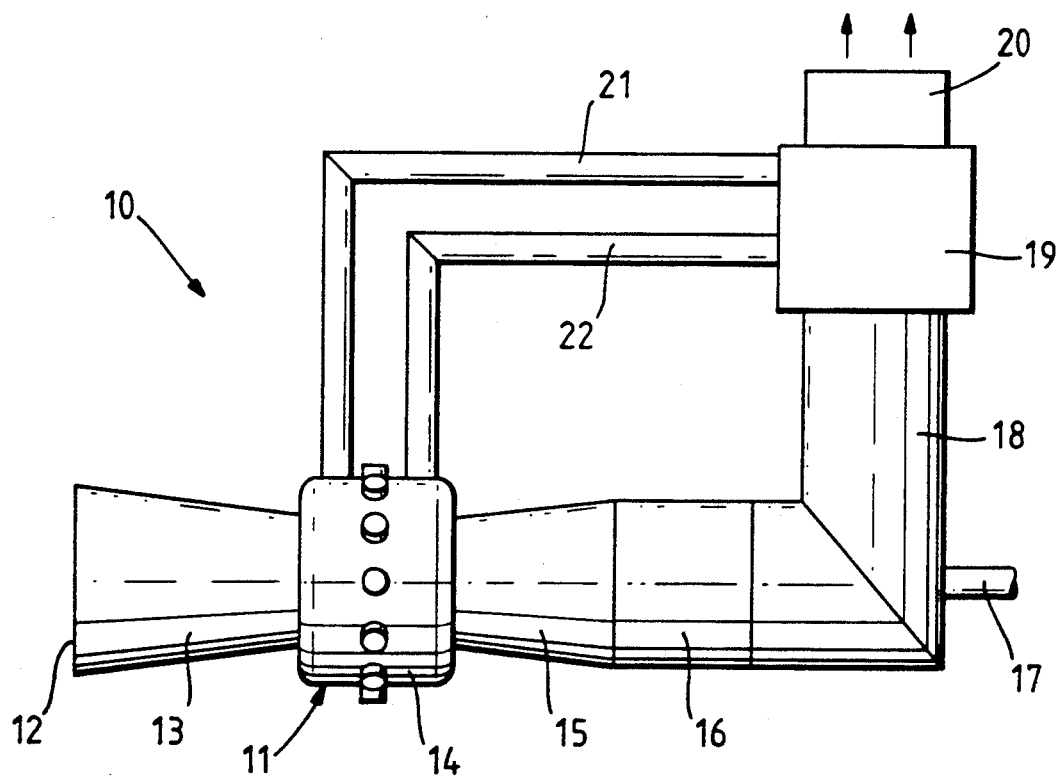
FIG. 1 is a side view in schematic form of a gas turbine engine power unit in accordance with the present invention.

With reference to FIG. 1, a gas turbine engine power unit generally indicated at 10 comprises a gas turbine engine 11 of conventional construction which includes in axial flow series an air intake 12, a compressor 13, combustion equipment 14 and a turbine 15. The exhaust efflux of the engine 11 is directed into and powers a power turbine 16 which in turn drives a power output shaft 17. From the power turbine 16, the engine exhaust efflux is directed by ducting 18 into a regenerative heat exchanger 19 before exhausting to atmosphere at 20.

The regenerative heat exchanger 19 is interconnected with the gas turbine engine 11 via first and second ducts 21 and 22 respectively although more ducts may be provided if necessary. The first duct 21 directs air which has been exhausted from the compressor 13 to the heat exchanger 19 where it is placed in heat exchange relationship with the hot gas efflux from the power turbine 16. That air, having been heated in the heat exchanger 19, is then returned to the gas turbine engine 11 via the second duct 22 and directed into the combustion equipment 14 where it is mixed with fuel and the mixture combusted. The resultant combustion products are then directed into and drive the turbine 16.

Figure 2:
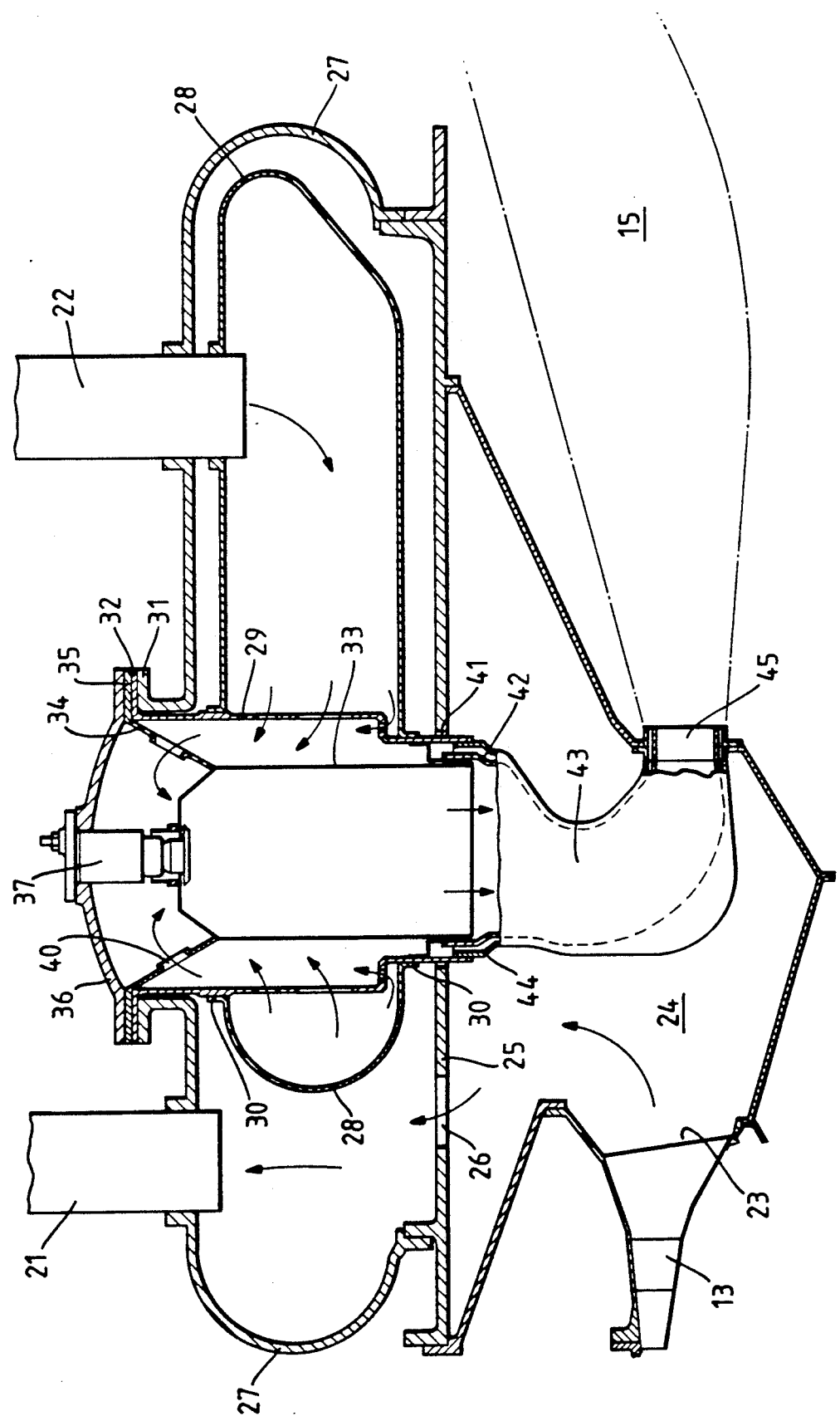
FIG. 2 is a sectioned side view of a portion of the combustion system of the gas turbine engine power unit shown in FIG. 1.

The manner in which air is directed from and to the gas turbine engine 11 via the first and second ducts 21 and 22 can be seen more easily if reference is now made to FIG. 2. Air exhausted from the downstream end 23 of the compressor 13 is directed into an annular chamber 24, one wall of which is defined by the engine outer casing 25. A plurality of apertures 26 in the casing 25 permit the air to flow into an annular axially elongate first manifold 27 which is located externally of the engine outer casing 25 and has one wall defined by the engine outer casing 25. The first duct 21 is in communication with the interior of the first manifold 27 so that air flows from the first manifold 27 into the duct 21 and thence to the regenerative heat exchanger 19 which is of conventional construction.

As described earlier, the air then returns from the regenerative heat exchanger 19 having been heated therein via the second duct 22. The second duct 22 directs the heated air into an annular second manifold 28 which is located wholly within the first manifold 27.

The second manifold 28 is solely supported from a plurality of radially extending tubes 29, each of which is in turn solely supported from the radially outer portion of the first manifold 27. The second manifold 28 is provided with a number of flanged apertures 30 which accommodate the tubes 29 in sliding engagement. It will be seen therefore that the annular second manifold 28 is capable of radial thermal expansion and contraction relative to the tubes 29 while still being supported thereby.

Figure 3:
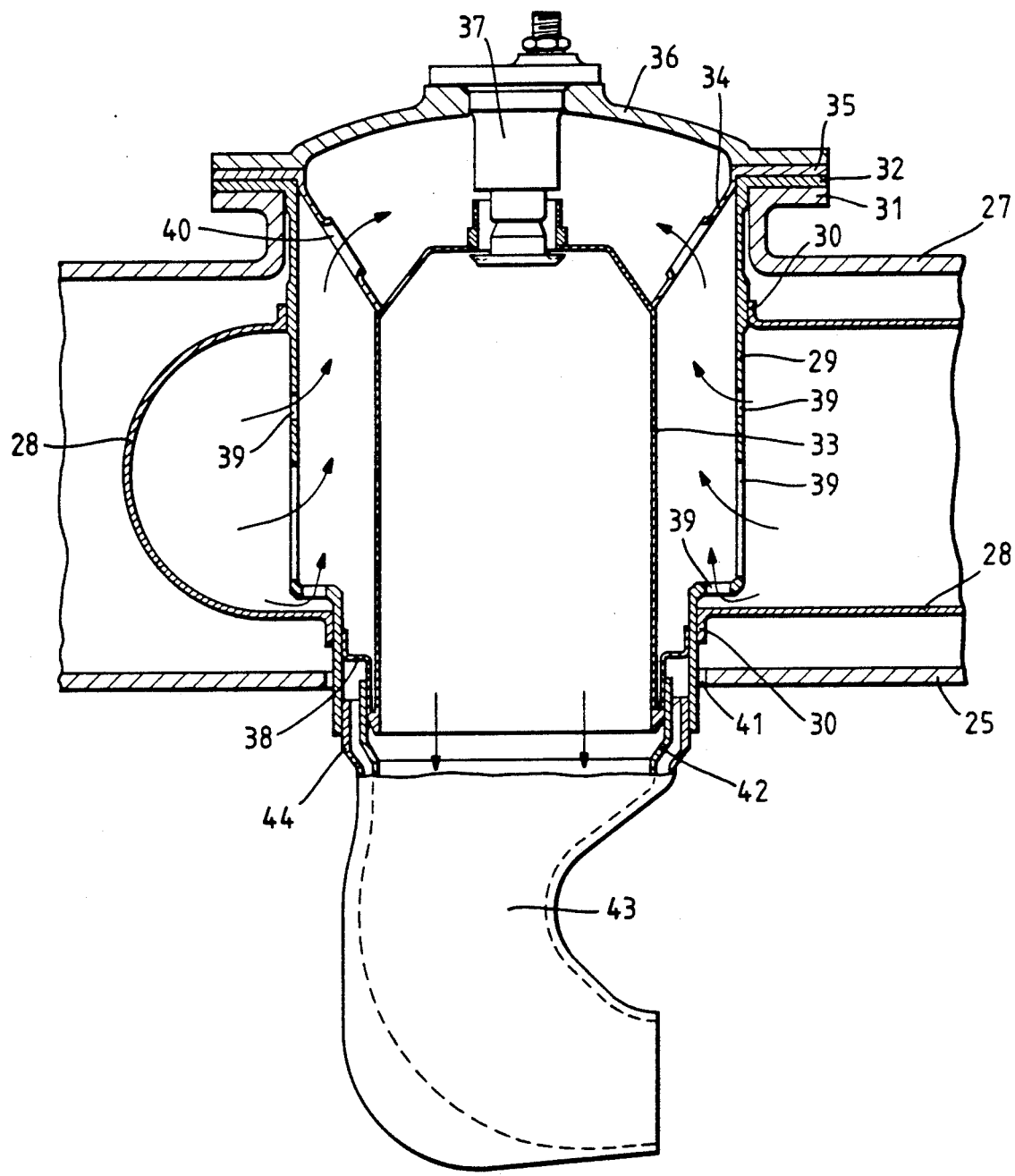
FIG. 3 is a view on an enlarged scale of a portion of the view shown in FIG. 2.

The mode of attachment of each tube 29 to the first manifold 28 can be seen more clearly if reference is now made to FIG. 3. The radially outer portion of the first manifold 27 is provided with flanged apertures 31 which engage a corresponding flange 32 provided on the radially outer extent of the tube 29. The radially inner end of each tube 29 extends through, but does not engage, a corresponding aperture 41 provided in the engine casing 25.

Each tube 29 contains a combustion chamber 33. The radially outer end of each combustion chamber 33 is provided with a frusto-conical support ring 34 which is flanged at its radially outwardmost extent 35 to engage the flange 32 on the tube 29. A cap 36 seals the radially outermost extent of each tube 29 and is flanged at 37 so that the flanges 32 and 35 are sandwiched between the flanges 37 and 31. Each cap 36 additionally supports a fuel injector 37 for the combustion chamber 33.

The radially inner extent of each combustion chamber 33 is provided with a ring 38 the wall of which is of cranked cross-sectional shape. The ring 38 is integral with the combustion chamber 33 but is in sliding engagement with the internal surface of the tube 29. It will be seen therefore that each combustion chamber 33 is free to thermally expand and contract relative to the tube 29 within which it is mounted.

Each of the tubes 29 is provided with a large number of apertures 39 in its wall. The apertures 39 permit hot air within the second manifold 28 to flow into the tube 29. Part of the air flow passes through apertures 40 provided in the frusto-conical support ring 34 and enters the combustion chamber 33 through the fuel injector 37 where it is mixed with fuel. The remainder of the air flow enters the combustion chamber 33 through holes provided along its length (not shown) to support combustion taking place within the combustion chamber 33 and to provide a certain degree of cooling of the combustion chamber 33 wall.

It will be appreciated that although each of the tubes 9 is depicted in the drawings as having two portions of different diameters with a stepped portion interconnecting the two portions, alternative configurations are possible. For instance, the tube 29 could be of generally frusto-conical configuration.

It may be possible under certain circumstances that the air pressure within the second manifold 28 may not be circumferentially uniform. If so, the air flows into the combustion chambers 33 may not be uniform either with the result that some combustion chambers 33 may receive more or less air then others. If this occurs, the sizes of the apertures 39 in the tubes 29 may be altered to achieve the desired flow rate.

The radially inner end of each combustion chamber 33 engages in sliding engagement with the inner skin 42 of a generally L-shaped cross-section double-skinned interconnecting duct 43. The outer skin 44 of the interconnecting duct 43 engages the radially inner end of the tube 29 in sliding engagement. Thus a certain degree of relative radial movement is possible between each combustion chamber 33/tube 29 combination and its corresponding interconnecting duct 43.

The hot combustion products from each combustion chamber 33 flow into its corresponding interconnecting duct 43. The walls of the interconnecting duct 43 are however protected from the effects of this hot gas flow by the provision of a flow of cooling air through the space between its inner and outer skins 42 and 44.

The interconnecting duct 43 direct the combustion products into the gas turbine engine turbine 15 via a plurality of appropriate guide vanes, one of which 45 can be seen in FIG. 2.

It will be seen therefore that the mounting of the combustion chambers 33 and the first and second manifolds in the manner described above, certain advantages result:

(1) The hot second manifold 28 is supported in such a manner that it is free to thermally expand and contract without imposing significant stresses on other adjacent components and without the use of fasteners.

(2) The radially inner end of each tube 29 provides support for both the radially inner end of its associated combustion chamber 33 and the radially outer end of its associated interconnecting duct 43. As a result, the outlet of the combustion chamber 33 and the inlet of its associated interconnecting duct 43 are maintained in alignment.

(3) There is no physical contact between the relatively cool engine casing 25 and the relatively hot downstream end of each tube 29. Consequently thermal stress between each tube 29 and the casing 25 is avoided.

(4) Each fuel injector 37 is maintained in alignment with its associated combustion chamber 33.

Although the present invention has been described with reference to a gas turbine engine in which the axes of the combustion chambers 33 are generally perpendicular to the longitudinal axis of the engine, it will be appreciated that this is not essential and that combustion chamber axes could be incident to the longitudinal axis of the engine at some other angle.

We claim:

1. A gas turbine engine power unit including a regenerative heat exchanger and a gas turbine engine having a plurality of combustion chambers, the axes of which combustion chambers are arranged to be incident to the longitudinal axis of said engine, a first annular manifold located externally of the casing of said engine coaxial with the longitudinal axis of said engine and adapted to receive air exhaust from the compressor of said engine, means adapted to direct air from said first manifold to said regenerative heat exchanger, means adapted to return said air from said regenerative heat exchanger having been heated therein to a second annular manifold located wholly within and coaxial with said first manifold, and plurality of generally tubular members, each of said combustion chambers being located within and solely supported by a corresponding one of said generally tubular members, each of said generally tubular members being supported from said first manifold and at least partially located within said second manifold, adapted in turn to support said second manifold and additionally apertured to facilitate the flow of air from said second manifold to said combustion chambers to support combustion therein, said casing being apertured to receive each of said generally tubular members so as to facilitate the exhaust of combustion products from said combustion chambers to the turbine of said engine, said engine unit including a plurality of interconnecting ducts, each duct interconnecting one of said combustion chambers and the turbine of said gas turbine engine, wherein each of said interconnecting ducts and its corresponding combustion chamber are interconnected by sliding contact so that alignment is maintained therebetween notwithstanding any relative thermal expansion and contraction therebetween, each of said interconnecting ducts being double-skinned, the inner of said skins being in said sliding contact with said corresponding combustion chamber.

2. A gas turbine engine power unit as claimed in claim 1 wherein the outer of said sins is in sliding contact with the tubular member containing said corresponding combustion chamber.

* * * * *